(12) United States Patent
You

(10) Patent No.: US 9,290,277 B2
(45) Date of Patent: Mar. 22, 2016

(54) SURVEILLANCE SYSTEM AND SURVEILLANCE METHOD

(71) Applicant: HANWHA TECHWIN CO., LTD., Changwon-si (KR)

(72) Inventor: Kyuhyong You, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/551,539

(22) Filed: Nov. 24, 2014

(65) Prior Publication Data

US 2015/0158598 A1    Jun. 11, 2015

(30) Foreign Application Priority Data

Dec. 11, 2013   (KR) .......................... 10-2013-0154101

(51) Int. Cl.
| | |
|---|---|
| *B64F 1/18* | (2006.01) |
| *H04N 7/18* | (2006.01) |
| *B64F 1/12* | (2006.01) |
| *B64C 39/02* | (2006.01) |
| *G05D 1/00* | (2006.01) |

(52) U.S. Cl.
CPC ................ *B64F 1/18* (2013.01); *B64C 39/024* (2013.01); *B64F 1/12* (2013.01); *G05D 1/0038* (2013.01); *H04N 7/181* (2013.01); *H04N 7/185* (2013.01); *B64C 2201/027* (2013.01); *B64C 2201/042* (2013.01); *B64C 2201/066* (2013.01); *B64C 2201/108* (2013.01); *B64C 2201/127* (2013.01); *B64C 2201/145* (2013.01)

(58) Field of Classification Search
CPC ............... B64F 1/14; B64F 1/22; G05D 1/00; G05D 1/101; G05D 1/102; G05D 1/104; H04N 7/181; H04N 7/183; H04N 7/185; B64C 2201/027
USPC ....... 701/1–4, 11, 15, 16, 23; 244/75.1, 76 R, 244/183, 189, 190, 114 R, 110 E, 115
See application file for complete search history.

(56) References Cited

U.S. PATENT DOCUMENTS

| | | | | |
|---|---|---|---|---|
| 4,818,990 | A | * | 4/1989 | Fernandes ................. 340/870.07 |
| 5,716,032 | A | * | 2/1998 | McIngvale .................... 244/185 |
| 8,162,256 | B2 | | 4/2012 | Goossen et al. |
| 8,418,959 | B2 | | 4/2013 | Kang et al. |
| 2006/0249623 | A1 | * | 11/2006 | Steele ........................... 244/116 |
| 2007/0228214 | A1 | * | 10/2007 | Horak .............................. 244/63 |
| 2009/0138138 | A1 | * | 5/2009 | Ferren et al. ...................... 701/3 |
| 2009/0294584 | A1 | * | 12/2009 | Lovell et al. ................ 244/110 F |
| 2012/0075461 | A1 | | 3/2012 | Yu et al. |

(Continued)

FOREIGN PATENT DOCUMENTS

| | | |
|---|---|---|
| KR | 10-2006-0079398 A | 7/2006 |
| KR | 10-1262968 B1 | 5/2013 |

*Primary Examiner* — Thomas Tarcza
*Assistant Examiner* — Tyler J Lee
(74) *Attorney, Agent, or Firm* — Sughrue Mion, PLLC

(57) ABSTRACT

Provided are a surveillance system and a surveillance method. The surveillance system includes a control tower configured to be coupled with and separated from a flying vehicle, and receive an image captured by the flying vehicle through a first communication network, wherein the control tower is further configured to transmit the received image to a central control station through a second communication network for analysis of the received image. The surveillance system may further include the flying vehicle and the central control station.

16 Claims, 7 Drawing Sheets

(56) References Cited

U.S. PATENT DOCUMENTS

| | | | |
|---|---|---|---|
| 2012/0261516 A1* | 10/2012 | Gilliland et al. | 244/183 |
| 2012/0286102 A1 | 11/2012 | Sinha et al. | |
| 2014/0032034 A1* | 1/2014 | Raptopoulos et al. | 701/25 |
| 2014/0277834 A1* | 9/2014 | Levien et al. | 701/2 |
| 2014/0316616 A1* | 10/2014 | Kugelmass | 701/8 |

* cited by examiner

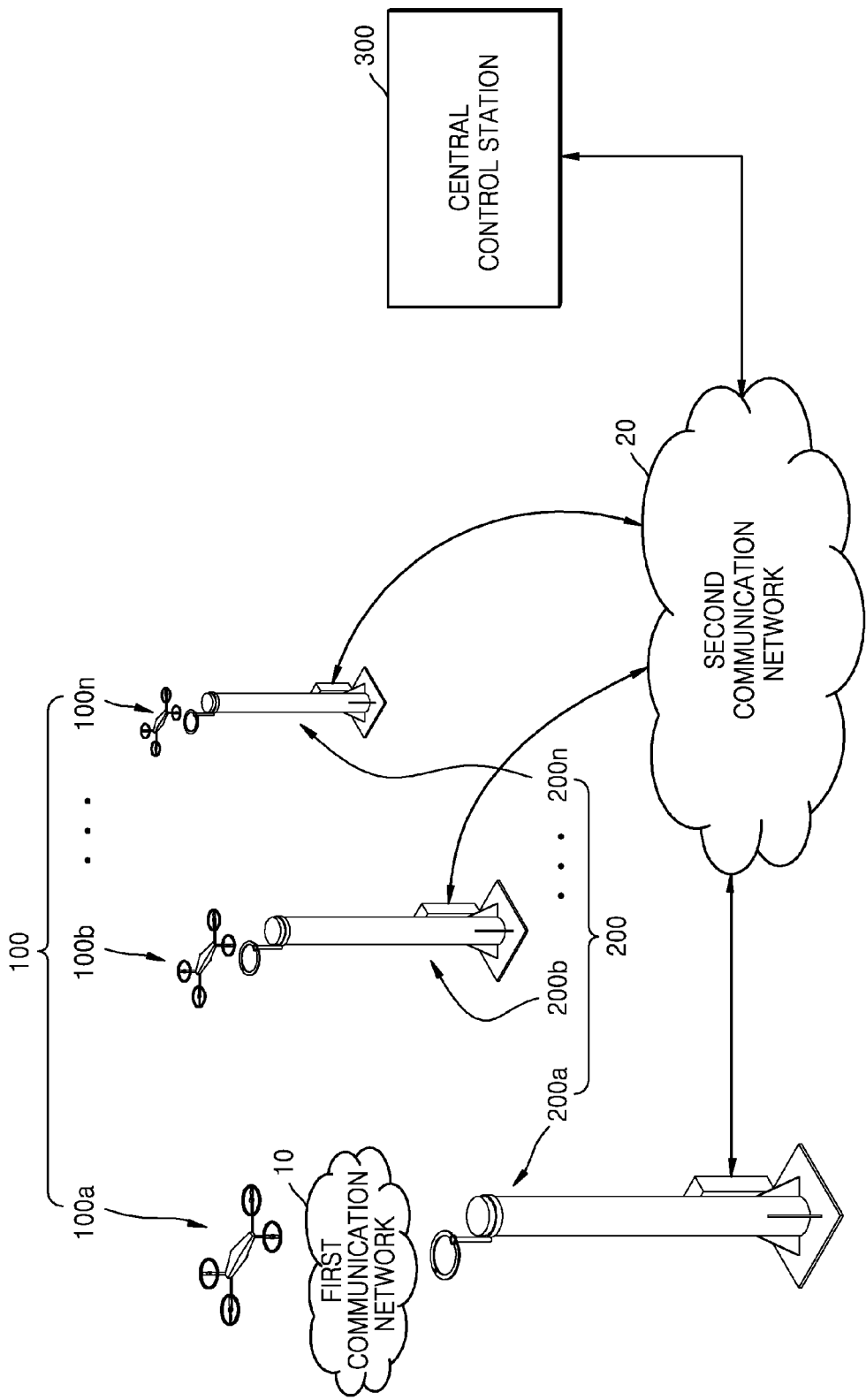

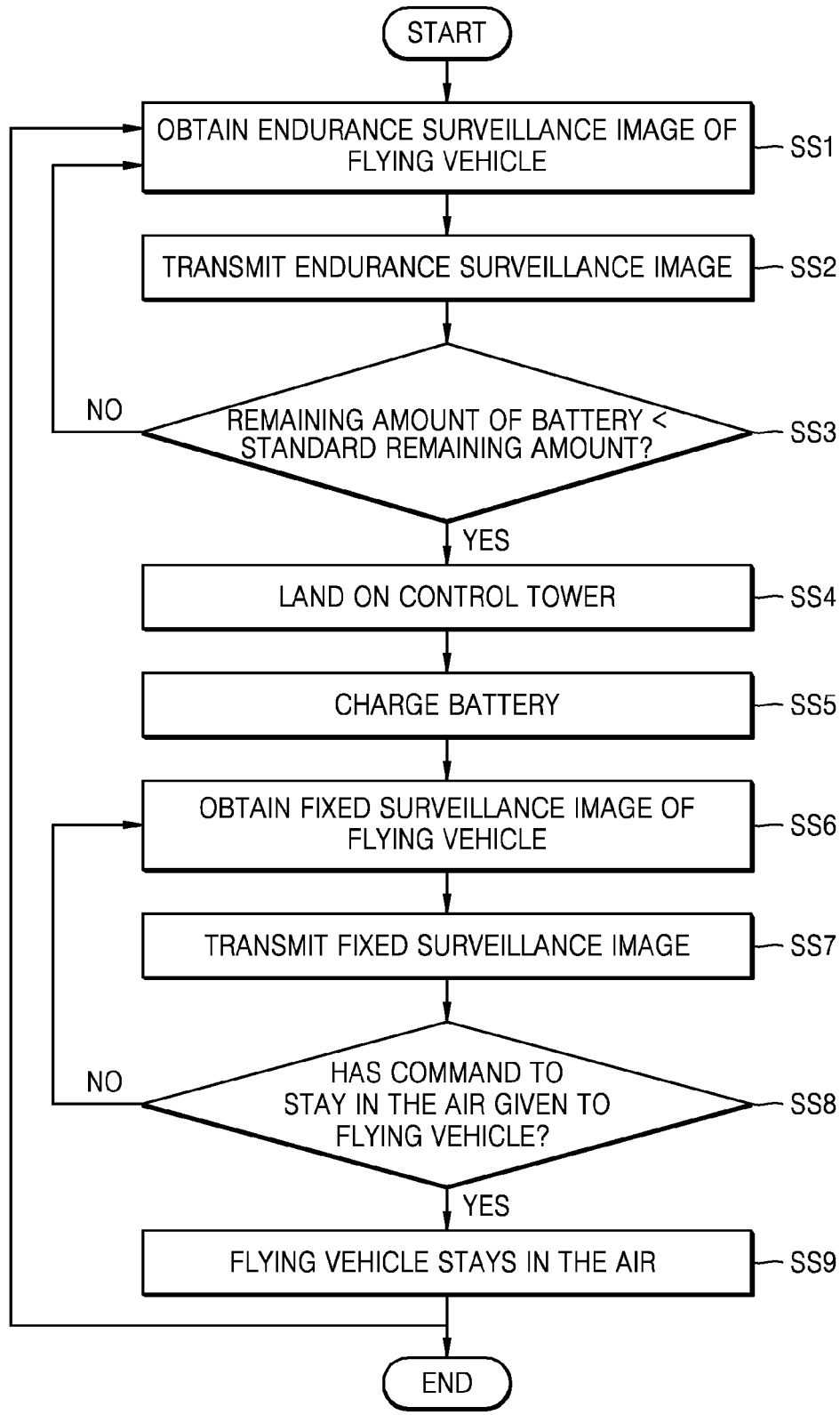

SURVEILLANCE SYSTEM AND SURVEILLANCE METHOD

CROSS-REFERENCE TO THE RELATED APPLICATION

This application claims priority from Korean Patent Application No. 10-2013-0154101, filed on Dec. 11, 2013, in the Korean Intellectual Property Office, the disclosure of which is incorporated herein in its entirety by reference.

BACKGROUND

1. Field

Apparatuses and methods consistent with exemplary embodiments of the inventive concept relate to surveillance.

2. Description of the Related Art

Various types of surveillance systems have been introduced to the market as the security market has recently been developed.

In general, a surveillance system is installed as a surveillance camera on a pillar, a ceiling, or a wall of an area that needs surveillance and an image captured by the surveillance camera is transmitted to a central control station to immediately do surveillance or the image is stored. In this manner, forest fires, road traffic, gas pipelines, or large power plants are easily monitored.

In the surveillance system described above, the surveillance camera is fixed to a position, and thus, an area that a surveillance camera monitors may be limited and an area where a surveillance camera is not able to be mounted cannot be monitored.

SUMMARY

A plurality of exemplary embodiments of the inventive concept provide a surveillance system that uses an unmanned flying vehicle.

Various aspects of the exemplary embodiments will be set forth in part in the description which follows and, in part, will be apparent from the description, or may be learned by practice of the presented embodiments.

According to an aspect of an exemplary embodiment, there is provides a surveillance system which may include a control tower configured to be coupled with and separated from a flying vehicle, and receive an image captured by the flying vehicle through a first communication network. The control tower is further configured to transmit the received image to a central control station through a second communication network for analysis of the received image.

The first communication network may be a short-range wireless communication network, and the second communication network may be a long-range wired and/or wireless communication network.

The control tower may include: a mounting portion with which the flying vehicle is configured to be coupled; and a power supply configured to supply power to the flying vehicle when the flying vehicle is coupled with the control tower.

The control tower may include: an image capturer configured to capture an image of the flying vehicle; and a landing guide configured to generate a landing guide signal based on the image obtained by the image capturer.

The landing guide may generate a landing guide signal by: capturing a first image of the flying vehicle by using the image capturer; comparing the first image with a pre-stored image to determine an amount of horizontal movement for the flying vehicle to generate and giving a command to horizontally move the flying vehicle based on the determined amount of horizontal movement; capturing a second image of the flying vehicle by using the image capturer; comparing the second image with the pre-stored image to determine an amount of vertical movement for the flying vehicle to generate and giving a command to vertically move the flying vehicle based on the determined amount of vertical movement; and determining an amount of altitude loss for the flying vehicle to generate and giving a command to the flying vehicle to lose altitude based on the determined amount of altitude loss.

The surveillance system may further include the flying vehicle and the central control station. The flying vehicle may include: a global positioning system (GPS) receiver configured to receive position information about the flying vehicle; a battery configured to supply power to the flying vehicle; and a controller configured to control an operation of the flying vehicle, wherein the controller comprises a program whereby the flying vehicle returns to the control tower based on a remaining amount of the power and the position information.

According to an aspect of another exemplary embodiment, there is provided a surveillance system which may include a control tower configured to be coupled with and separated from a flying vehicle installed with a camera, wherein the control tower includes: an image capturer configured to capture an image of the flying vehicle; a power supply configured to supply power to the flying vehicle when the control tower is coupled with the flying vehicle; and a landing guide configured to generate a landing guide signal based on the captured image of the flying vehicle.

The surveillance system may further include the flying vehicle. The flying vehicle may include: a GPS receiver configured to receive position information about the flying vehicle; a battery configured to supply power to the flying vehicle; and a controller configured to control an operation of the flying vehicle, wherein the controller comprises a program whereby the flying vehicle returns to the control tower based on a remaining amount of power at the battery and the position information.

The landing guide may generate a landing guide signal by: capturing a first image of the flying vehicle by using the image capturer; comparing the first image with a pre-stored image to determine an amount of horizontal movement for the flying vehicle to generate and giving a command to horizontally move the flying vehicle based on the determined amount of horizontal movement; capturing a second image of the flying vehicle by using the image capturer; comparing the second image with the pre-stored image to determine an amount of vertical movement of the flying vehicle and giving a command to vertically move the flying vehicle based on the determined amount of vertical movement; and determining an amount of altitude loss for the flying vehicle to generate and giving a command to the flying vehicle to lose altitude based on the determined amount of altitude loss.

According to an aspect of still another exemplary embodiment, there is provided a surveillance method which may include: obtaining an endurance surveillance image captured by a flying vehicle; transmitting the captured endurance surveillance image to a central control station via a control tower disposed adjacent to the flying vehicle; comparing a remaining amount of power at a battery of the flying vehicle with a standard remaining amount of power; and if the remaining amount of power at the battery is less than the standard remaining amount of power, landing the flying vehicle on the control tower based on a landing guide signal of the control tower.

The surveillance method may further include charging the battery of the flying vehicle after the flying vehicle has landed on the control tower.

The surveillance method may further include: capturing a fixed surveillance image by the flying vehicle after the flying vehicle has landed on the control tower; and transmitting the captured fixed surveillance image to the central control station via the control tower.

The surveillance method may further include receiving an endurance command based on a preset program that is set according to a charged state of the battery of the flying vehicle or an endurance command from the central control station.

The landing guide signal may be generated by: capturing a first image of the flying vehicle by an image capturer of the control tower; comparing the captured first image with a pre-stored image to determine an amount of horizontal movement for the flying vehicle to generate and giving a command to horizontally move the flying vehicle based on the determined amount of horizontal movement; capturing a second image of the flying vehicle by using the image capturer; comparing the second image with the pre-stored image to determine an amount of vertical movement for the flying vehicle to generate and giving a command to vertically move the flying vehicle based on the determined amount of vertical movement; and determining an amount of altitude loss for the flying vehicle to generate and giving a command to the flying vehicle to lose altitude based on the determined amount of altitude loss.

The surveillance method may further include: receiving position information about the flying vehicle; supplying power to the flying vehicle; and controlling an operation of the flying vehicle, wherein the controlling is performed using a program whereby the flying vehicle returns to the control tower based on the remaining amount of power at the battery and the position information.

The surveillance method may further include: coupling the flying vehicle with the control tower and separating the flying vehicle from the control tower; and supplying power to the flying vehicle when the flying vehicle is coupled with the control tower.

The surveillance method may include: capturing an image of the flying vehicle; and generating a landing guide signal based on the captured image of the flying vehicle.

The captured endurance surveillance image may be transmitted from the flying vehicle to the control tower through a first communication network, and the captured endurance surveillance image may be transmitted from the control tower to the central control station through a second communication network. The first communication network may be a short-range wireless communication network, and the second communication network may be a long-range wired and/or wireless communication network.

BRIEF DESCRIPTION OF THE DRAWINGS

These and/or other aspects will become apparent and more readily appreciated from the following description of the exemplary embodiments, taken in conjunction with the accompanying drawings, in which:

FIG. 1 illustrates a structure of a surveillance system according to an exemplary embodiment;

FIG. 6 is a flowchart of a surveillance method used by a surveillance system, according to an exemplary embodiment.

DETAILED DESCRIPTION OF THE EXEMPLARY EMBODIMENTS

Figure 2A:
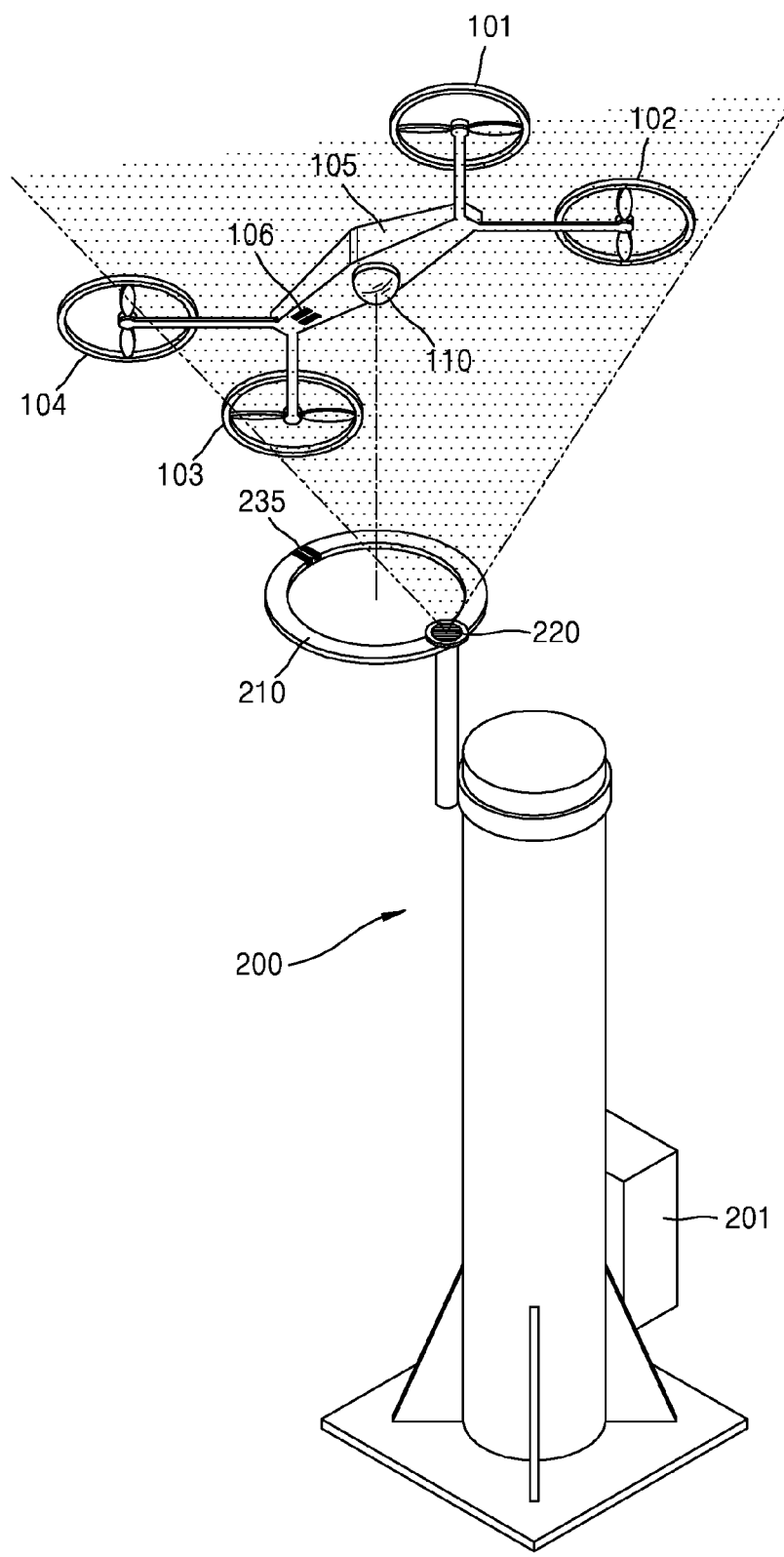
FIGS. 2A and 2B illustrate a flying vehicle and a control tower according to exemplary embodiments.

Reference will now be made in detail to the exemplary embodiments which are described in reference to the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the embodiments. As used herein, the term "and/or" includes any and all combinations of one or more of the associated listed items. Expressions such as "at least one of," when preceding a list of elements, modify the entire list of elements and do not modify the individual elements of the list.

Since the inventive concept may have various modifications and several embodiments, exemplary embodiments are shown in the drawings and will be described in detail. Advantages, features, and a method of achieving the same will be specified with reference to the embodiments described below in detail together with the attached drawings. However, the embodiments may have different forms and should not be construed as being limited to the descriptions set forth herein.

It will be understood that although the terms "first", "second", etc. may be used herein to describe various components, these components should not be limited by these terms. These components are only used to distinguish one component from another.

Singular expressions, unless defined otherwise in contexts, include plural expressions.

In the embodiments below, it will be further understood that the terms "comprise" and/or "have" used herein specify the presence of stated features or components, but do not preclude the presence or addition of one or more other features or components.

In the embodiments below, it will be understood when a portion such as a layer, an area, or an element is referred to as being "on" or "above" another portion, it can be directly on or above the other portion, or intervening portion may also be present.

Also, in the drawings, for convenience of description, sizes of elements may be exaggerated or contracted. In other words, since sizes and thicknesses of components in the drawings are arbitrarily illustrated for convenience of explanation, the following embodiments are not limited thereto.

FIG. 1 illustrates a structure of a surveillance system according to an exemplary embodiment.

Referring to FIG. 1, the surveillance system according to the present embodiment includes a flying vehicle 100 mounted with a camera 110, a control tower 200 with respect to which the flying vehicle 100 couples or separates, and a central control station 300. Also, the surveillance system includes a first communication network 10 that provides a communication environment between the flying vehicle 100 and the control tower 200 and a second communication network 20 that provides a communication environment between the control tower 200 and the central control station 300.

In general, a closed-circuit television (CCTV) camera is fixed to a position so that an area that the CCTV camera may monitor is limited and areas where a CCTV cannot be installed cannot be monitored. In addition, a surveillance system implemented by a small unmanned airplane mounted with a camera uses a method in which the unmanned airplane is directly controlled by a central control station to observe a surveillance area. However, due to a limited battery capacity of the unmanned airplane of the surveillance system, there are spatial limitations regarding a dispatch from the central control station.

According to an exemplary embodiment, the flying vehicle 100 is mounted with the camera 110, and thus, surveillance images may be obtained both when the flying vehicle 100 is coupled with and fixed to the control tower 200 and when the flying vehicle 100 is separated from the control tower 200 and staying in the air. The surveillance images may be transmitted to the control tower 200, and the control tower 200 transmits the images to a central control station 300.

The flying vehicle 100 may communicate with the control tower 200 via the first communication network 10, and the control tower 200 and the central control station 300 may communicate with each other via a second communication network 20.

The first communication network 10 may be a communication network that is used by the flying vehicle 100 to communicate with the control tower 200 and may be a short-range wireless communication network. A communication network that may be used as the first communication network 10 may be communication network that uses various methods such as a Bluetooth method, a ZigBee method, or a Wi-Fi method.

The second communication network 20 is a communication network that is used by the control tower 200 to communicate with the central control station 300 and may be a long-range wired and/or wireless communication network. The second communication network 20 may be a commercial mobile communication network that is used for communication between a relay station and a base station for mobile communication. The second communication network 20 may be a communication network for communications such as 3G, W-CDMA, long term evolution (LTE), IEEE 802.106, or Wireless Mobile Broadband Service (WMBS). Also, the second communication network 20 may be a wired communication network that uses a commercial Internet communication network, but is not limited thereto.

That is, according to an exemplary embodiment, as the control tower 200 functions as a relay station, even if a distance between the central control station 300 and the flying vehicle 100 increases, an image obtained by surveillance by the flying vehicle 100 may be transmitted to the central control station 300.

Also, according to an exemplary embodiment, the control tower 200 may supply power to the flying vehicle 100. When the flying vehicle 100 is coupled with and fixed to the control tower 200, the flying vehicle 100 may receive power from the control tower 200. Accordingly, the flying vehicle 100 may stay in the air around the control tower 200 to obtain and transmit surveillance images, and when the remaining amount of a battery thereof reaches a predetermined level, the flying vehicle 100 may return to the control tower 200 to charge the battery thereof.

The flying vehicle 100 may be set to travel along a preset path around the control tower 200. However, the embodiments are not limited thereto, and the flying vehicle 100 may be fixed to the control tower 200 during normal times and do surveillance, and may be separated from the control tower 200 according to a command by the central control station 300 and go to an area according to the command and do surveillance there. When the flying vehicle 100 is separated from the control tower 200, the flying vehicle 100 may be designed to automatically return to the control tower 200 by considering the remaining amount of battery thereof and a distance between the flying vehicle 100 and the control tower 200.

The flying vehicle 100 may include a global positioning system (GPS) receiver and go to a destination and obtain a distance between the flying vehicle 100 and the control tower 200 by using the GPS receiver.

The central control station 300 observes or monitors a predetermined area based on images obtained by the camera 110 of the flying vehicle 100. The central control station 300 may include a unit that monitors or stores images transmitted by the camera 110 in real time or a unit that transmits or receives a control signal used to control the flying vehicle 100.

The central control station 300 communicates with the control tower 200 via the second communication network 200 and may control the flying vehicle 100 based on the communication.

According to an exemplary embodiment, the flying vehicle 100 may include a plurality of flying vehicles, for example, first to $n^{th}$ flying vehicles 100a through 100n, and the control tower 200 may also include a plurality of control towers, for example, first to $n^{th}$ control towers 200a through 200n.

The second communication network 20 may further include a network switch to transmit a plurality of pieces of data transmitted by the first to $n^{th}$ control towers 200a through 200n to the central control station 300 or to transmit a plurality of signals transmitted by the central control station 300 to the first to $n^{th}$ control towers 200a through 200n. For example, the network switch may be an Ethernet switch. Collision between data may be prevented by using the network switch.

The first to $n^{th}$ flying vehicles 100a through 100n and the first to $n^{th}$ control towers 200a through 200n may be assigned with unique identification numbers, respectively. Accordingly, the first to $n^{th}$ flying vehicles 100a through 100n may be individually controlled by the central control station 300. For example, the surveillance system may be initially set such that the first flying vehicle 100a is mounted on the first control tower 200a, and the $n^{th}$ flying vehicle 100n is mounted on the $n^{th}$ control tower 200n, and the set up may be modified later by a command of the central control station 300. Alternatively, the central control station 300 may transmit a command regarding surveillance at a predetermined position to the first flying vehicle 100a.

Although FIG. 1 illustrates an exemplary embodiment in which one flying vehicle is coupled with and separated from one control tower, the inventive concept is not limited thereto. That is, according to another exemplary embodiment, two or more flying vehicles may be coupled with or separated from one control tower, and according to still another exemplary embodiment, one flying vehicle may be coupled with or separated from two or more control towers. Also, one or more flying vehicles may receive power from one or more control towers while flying in the air in a wireless manner, e.g., by using a magnetic field or an electromagnetic field.

According to the surveillance system of the current exemplary embodiment, the camera 110 may be mounted on the flying vehicle 100 to monitor an area where it is difficult to mount a fixed-type surveillance camera, and the flying vehicle 100 may receive power not from the central control station 300 but from the control tower 200 so that power may be efficiently used and a broad area may be monitored.

Hereinafter, the surveillance system according to the exemplary embodiments will be described in more detail with reference to FIGS. 2A through 4.

Figure 2B:
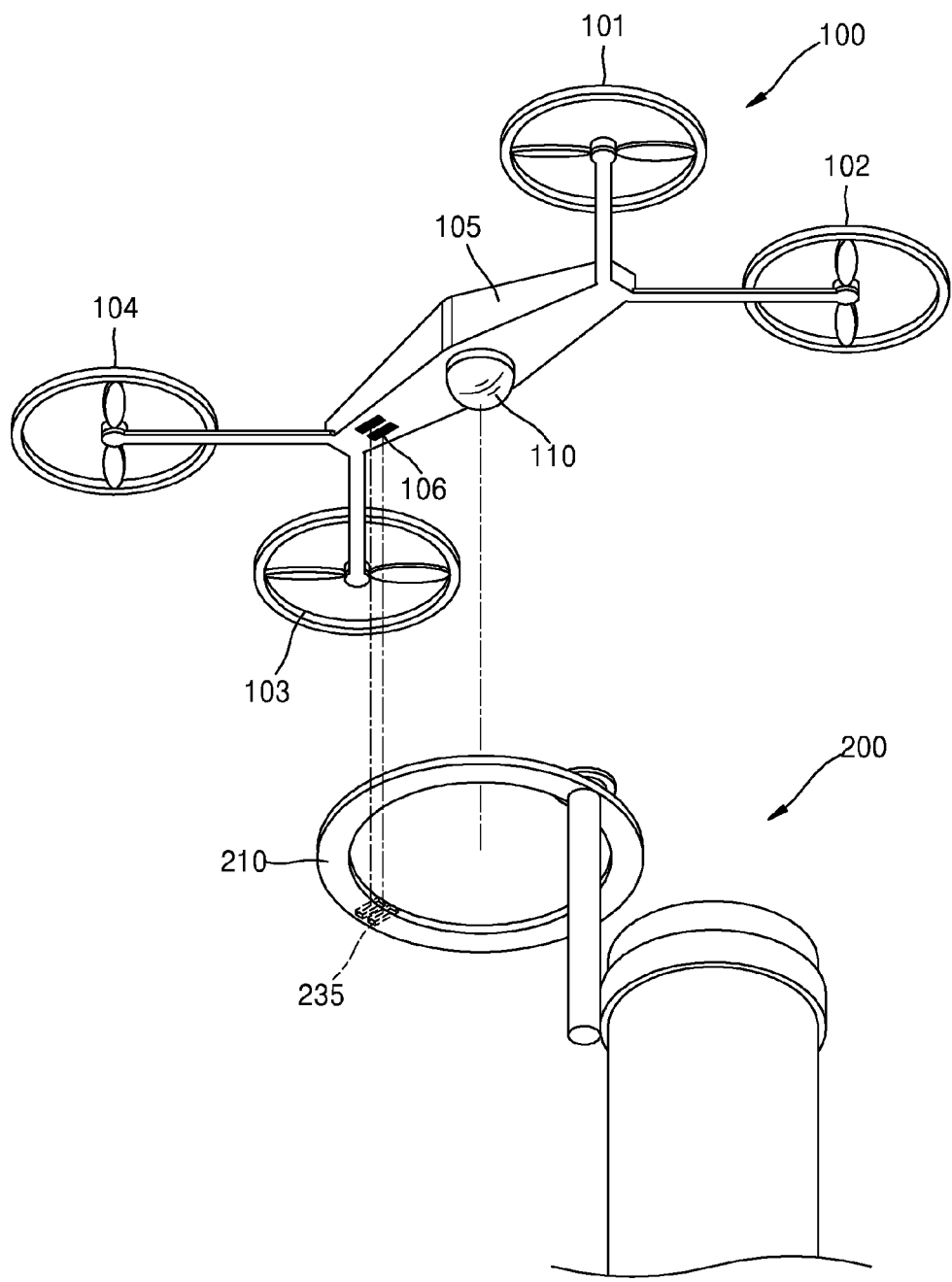
Figure 3:
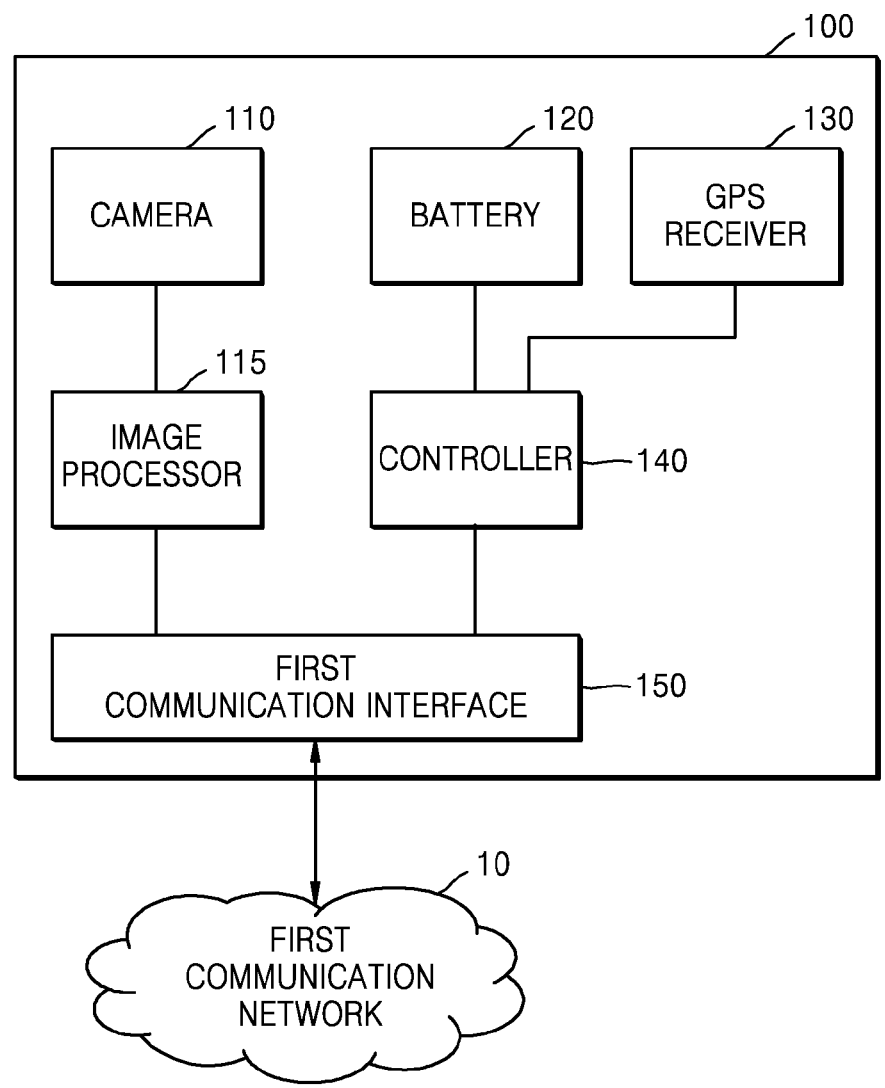
FIG. 3 is a block diagram of a flying vehicle according to an exemplary embodiment.
Figure 4:
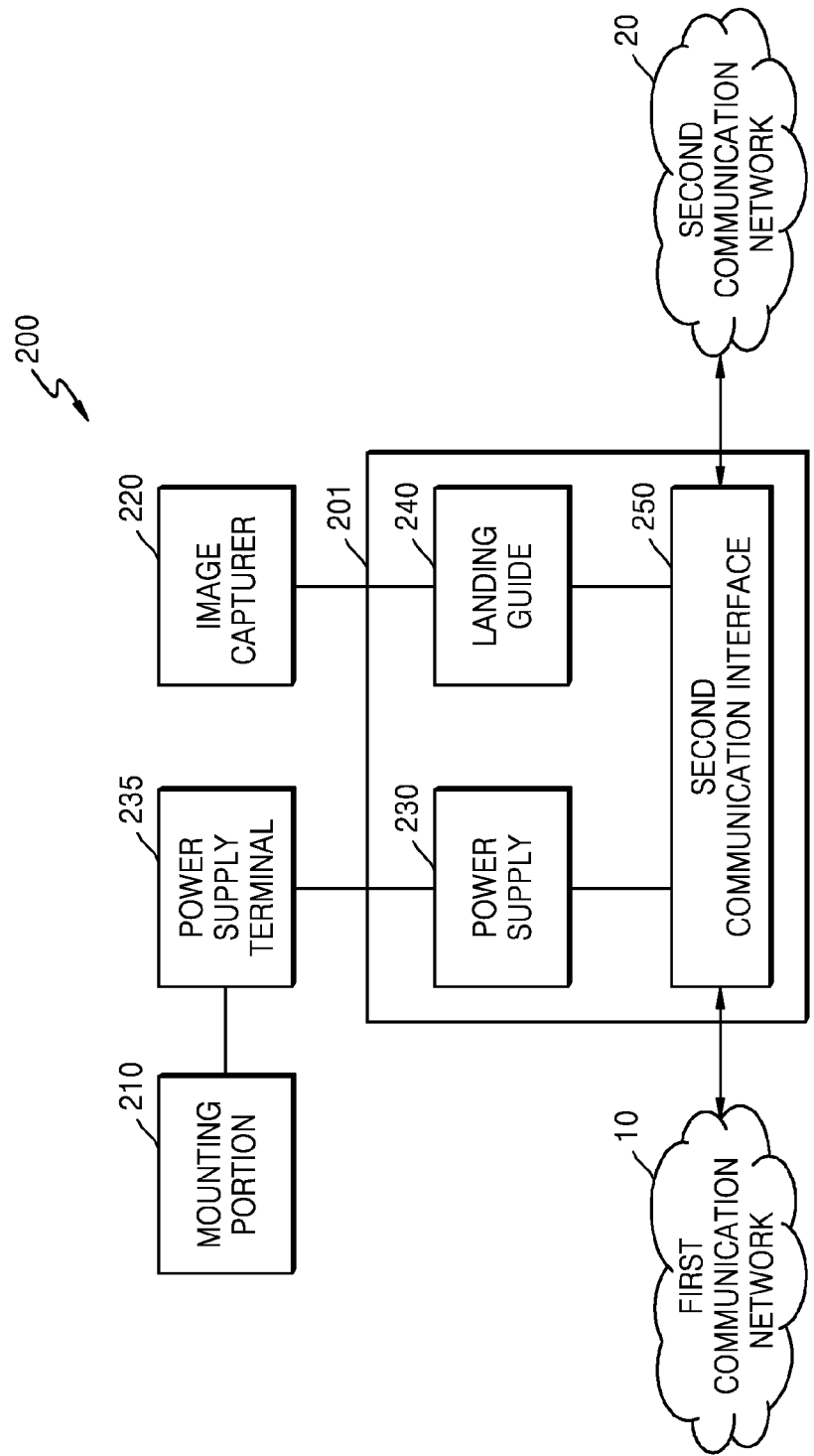
FIG. 4 is a block diagram of a control tower according to an exemplary embodiment.

FIGS. 2A and 2B illustrate a flying vehicle 100 and a control tower 200 according to an exemplary embodiment. FIG. 3 is a block diagram of the flying vehicle 100 according to an exemplary embodiment. FIG. 4 is a block diagram of the control tower 200 according to an exemplary embodiment.

FIG. 2A is a view of the flying vehicle 100 and the control tower 200 seen from above, and FIG. 2B is a view of the flying vehicle 100 and the control tower 200 seen from below.

Referring to FIGS. 2A and 2B, the surveillance system includes the flying vehicle 100 and the control tower 200. The flying vehicle 100 is a vertical take-off and landing unmanned flying vehicle and may receive power via a battery. The camera 110 is mounted under the flying vehicle 100 so as to obtain surveillance images both when the flying vehicle 100 is coupled with and separated from the control tower 200. In some embodiments, the flying vehicle 100 may be a flying vehicle that includes a first propeller 101, a second propeller 102, a third propeller 103, and a fourth propeller 104 around a body 105. However, the flying vehicle 100 is not limited thereto, and any flying vehicle that is mounted with a camera and is controlled without a person therein may be used as the flying vehicle 100.

The camera 110 and a charging terminal 106 may be mounted under the body 105 of the flying vehicle 100. The charging terminal 106 engages with a power supply terminal 235 of the control tower 200 when the flying vehicle 100 is coupled with the control tower 200. A battery of the flying vehicle 100 may be charged by power received from the control tower 200. While the charging terminal 106 is illustrated as being under the body 105, the charging terminal 106 is not limited thereto. For example, the charging terminal 106 may be disposed on an upper center of the body 105. In this case, an additional structure including the power supply terminal 235 that may engage with the charging terminal 106 may be mounted in the control tower 200. The additional structure may be designed to automatically engage with the charging terminal 106 of the flying vehicle 100 when the flying vehicle 100 is coupled with the control tower 200.

The control tower 200 includes a mounting portion 210 with which the flying vehicle 100 is coupled, a landing guide 240 (FIG. 4) that generates a landing guide signal to help the flying vehicle 100 land on the mounting portion 210, and a control box 201 that includes a power supply 230 (FIG. 4) supplying power to the flying vehicle 100. The control box 201 further includes a second communication interface 250 (FIG. 4) that functions as a communication interface between the flying vehicle 100 and the central control station 300.

The mounting portion 210 may be formed to support a portion that connects between the body 105 of the flying vehicle 100 and the first through fourth propellers 101, 102, 103, and 104 and expose the camera 110. Thus, when the flying vehicle 100 is coupled with the control tower 200 also, the flying vehicle 100 may function as a fixed-type surveillance camera.

An image capturer 220 that captures an image of the flying vehicle 100 may be formed at a first side of the mounting portion 210 or above the control tower 200. A landing guide signal may be generated and transmitted to the flying vehicle 100 based on the image captured by the image capturer 220. This will be described in detail later.

The power supply terminal 235 that connects to the power supply 230 supplying power to the flying vehicle 100 may be included at a second side of the mounting portion 210 or above the control tower 200. Thus, when the flying vehicle 100 is coupled with the mounting portion 210, the charging terminal 106 of the flying vehicle 100 and the power supply terminal 235 of the mounting portion 210 may be connected to each other and the battery of the flying vehicle 100 is charged at this time.

According to the above-described structure, in the surveillance system according to the current embodiment, when the flying vehicle 100 is coupled with the control tower 200, the flying vehicle 100 is fixed to the control tower 200 to receive power from the control tower 200 and monitor a peripheral area at the same time, and when the flying vehicle 100 is separated from the control tower 200, the flying vehicle 100 may move around the control tower 200 and up to areas from the control tower 200 vertically and/or horizontally by a predetermined radial distance and monitor the areas. As the flying vehicle 100 is separable from the control tower 200, areas where it is difficult to install a camera or where no camera is installed may also be monitored.

FIG. 3 is a block diagram of a structure of the flying vehicle 100, according to an exemplary embodiment.

Referring to FIG. 3, the flying vehicle 100 includes a first communication interface 150, a controller 140, a camera 110, an image processor 115, a battery 120, and a GPS receiver 130.

The first communication interface 150 may transmit or receive a signal to or from the control tower 200 via the first communication network 10. The first communication interface 150 may transmit a surveillance image obtained by the camera 110 through the first communication network 10. The first communication interface 150 may transmit through the first communication network 10 information about the battery 120 or position information received via the GPS receiver 130. Also, the first communication interface 150 may receive a landing guide signal transmitted by the control tower 200 or a command signal that directs the flying vehicle 100 to move, and transmit the received signals to the controller 140.

The controller 140 is a main controller that controls the whole flying vehicle 100 and may control an operation of the flying vehicle 100 by receiving a control signal through the first communication interface 150. Also, the controller 140 may control an operation of the flying vehicle 100 based on a preset program.

The preset program may be a program that determines whether to return to the control tower 200 by checking the remaining amount of power at the battery 120. Alternatively, the preset program may determine whether to return to the control tower 200 by considering both a distance from the control tower 200 and the remaining amount of power at the battery 120. The distance from the control tower 200 may be calculated based on information received from the GPS receiver 130.

Alternatively, the preset program may be a program that controls the flying vehicle 100 to regularly circle the control tower 200.

The controller 140 may control an operation of the flying vehicle 100 based on the preset program as described above. Also, the controller 140 may control an operation of the flying vehicle 100 based on a signal received from the central control station 300. Also, when the flying vehicle 100 lands on the control tower 200, the controller 140 may control an operation of the flying vehicle 100 based on a landing guide signal. The control of an operation of the flying vehicle 100 by using the controller 140 refers to all operations of modifying a position and a direction of the flying vehicle 100, that is, factors such as rotational speeds of the first through fourth propellers 101, 102, 103, and 104, the horizontal or vertical movement of the body 105, or gaining or losing altitude of the flying vehicle 100.

The camera 110 is mounted on the flying vehicle 100 and captures an image of a surveillance area to obtain a surveillance image.

The image processor 115 may convert an image obtained by the camera 110 such that the image may be transmitted through wireless communication. The converted image data may be transmitted to the control tower 200 via the first communication interface 150.

The GPS receiver 130 receives position information about the flying vehicle 100 via a GPS satellite. The controller 140 may move the flying vehicle 100 based on the position information. Also, the position information may be transmitted to the control tower 200 through the first communication interface 150.

FIG. 4 is a block diagram of the control tower 200 according to an exemplary embodiment.

Referring to FIG. 4, the control tower 200 may include the mounting portion 210, the power supply terminal 235, the image capturer 220, and the control box 201. The control box 201 includes the second communication interface 250, the landing guide 240, and the power supply 230.

The second communication interface 250 transmits or receives a signal to or from the flying vehicle 100 through the first communication network 10 and transmits or receives a signal to or from the central control station 300 through the second communication network 20. The second communication interface 250 may transmit through the second communication network 20 to the central control station 300 a surveillance image transmitted by the flying vehicle 100 or a signal received by the flying vehicle 100 such as position information of the flying vehicle 100. The second communication interface 250 also performs the function of converting image data according to a communication network. Also, the second communication interface 250 may perform the function of receiving a signal transmitted from the central control station 300 and transmit the same to the flying vehicle 100.

Also, the second communication interface 250 may transmit a landing guide signal generated by the landing guide 240 to the flying vehicle 100 through the first communication network 10 when the flying vehicle 100 lands on the control tower 200.

The image capturer 220 may capture an image of the flying vehicle 100. The image capturer 220 may capture an image of the flying vehicle 100 from a time point when the flying vehicle 100 tries to land on the control tower 200 so as to provide basic data based on which the landing guide 240 generates a landing guide signal.

The landing guide 240 may generate a landing guide signal based on an image captured by the image capturer 220 and transmit the landing guide signal to the flying vehicle 100 so as to allow the flying vehicle 100 to safely land on the mounting portion 210 of the control tower 200.

Figure 5:
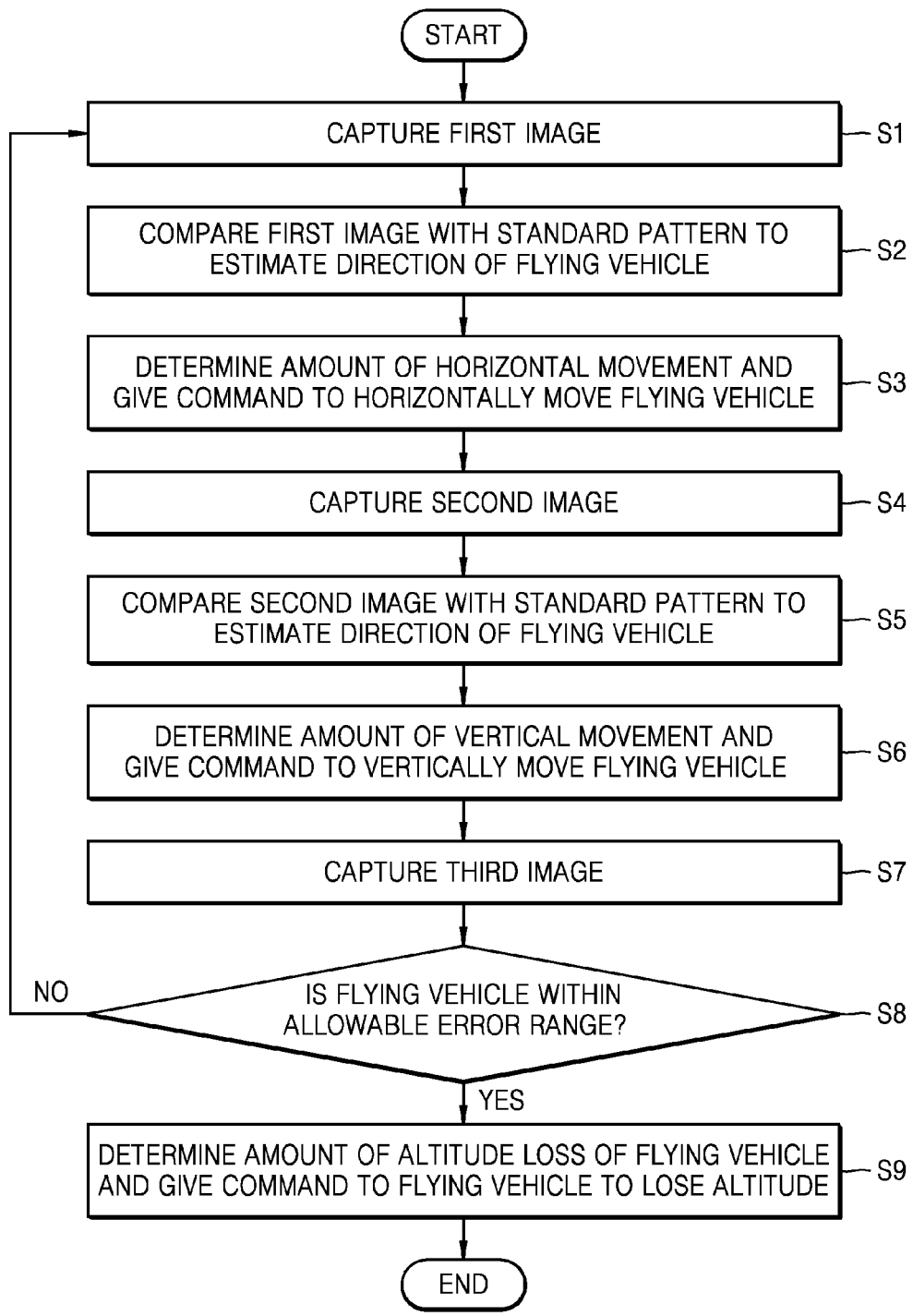
FIG. 5 is a flowchart of an operation of generating a landing guide signal of a landing guide included in a control tower, according to an exemplary embodiment.

FIG. 5 is a flowchart of an operation of generating a landing guide signal, performed by the landing guide 240 included in the control tower 200, according to an exemplary embodiment.

A preset standard pattern that defines a direction and a size of at least one of the body 105 and the first through fourth propellers 101 through 104 is stored in the landing guide 240. By comparing the standard pattern with an image of the flying vehicle 100 captured by the image capturer 220, a direction, a position, and altitude of the flying vehicle 100 may be estimated.

First, in operation S1, when the flying vehicle 100 arrives at a vertical position of the control tower 200 and tries landing, the image capturer 220 captures a first image of the flying vehicle 100.

Next, the first image of the flying vehicle 100 and the standard pattern are compared to estimate a direction of the flying vehicle 100 in operation S2. An amount of horizontal movement (yaw) for the flying vehicle 100 to generate is determined based on the estimated direction to give a command to horizontally move the flying vehicle 100 based on the determined amount of horizontal movement in operation S3. The command is transmitted to the controller 140 of the flying vehicle 100 through the second communication interface 250, and an operation of the flying vehicle 100 is controlled by the controller 140.

Next, the image capturer 220 captures a second image of the flying vehicle 100 in operation S4 and compares the second image with the standard pattern to estimate a position of the flying vehicle 100 in operation S5. An amount of vertical movement (pitch/roll) of the flying vehicle 100 is determined based on the estimated position to give a command to vertically move the flying vehicle 100 based on the determined amount of vertical movement in operation S6. The command is transmitted to the controller 140 of the flying vehicle 100 through the second communication interface 250, and an operation of the flying vehicle 100 is controlled by the controller 140.

Next, the image capturer 220 captures a third image of the flying vehicle 100 in operation S7 and determines whether the flying vehicle 100 is within an error range where the flying vehicle 100 is able to land in operation S8. If an allowable error range is exceeded, the operation returns to operation S1 to sequentially repeat operations S1 through S8. Otherwise, if the flying vehicle 100 is within the error range where the flying vehicle 100 is able to land, the altitude of the flying vehicle 100 is estimated to determine an amount of altitude loss for the flying vehicle 100 to generate and give a command to the flying vehicle 100 to lose altitude based on the determined amount of altitude loss in operation S9.

According to the method described above, the flying vehicle 100 may safely land on the control tower 200 in a set direction. Once the flying vehicle 100 is coupled with the control tower 200, the flying vehicle 100 receives power from the control tower 200 to charge a battery of the flying vehicle 100.

As described above, according to the surveillance system of the current embodiment, surveillance may be efficiently done by using the flying vehicle 100 and the control tower 200 without space limitations, and the flying vehicle 100 may safely land by using the landing guide portion 240 of the control tower 200 and be recharged.

FIG. 6 is a flowchart of a surveillance method used by a surveillance system, according to an exemplary embodiment.

The surveillance method according to the current embodiment includes operation SS1 of obtaining an endurance surveillance image of the flying vehicle 100, operation SS2 of transmitting the endurance surveillance image to the central control station 300 via the control tower 200 disposed adjacent to the flying vehicle 100, operation SS3 of comparing the remaining amount of power at a battery of the flying vehicle 100 with a standard remaining amount, and operation SS4 of landing the flying vehicle 100 on the control tower 200 via a landing guide signal of the control tower 200 if the remaining amount of power at the battery thereof is less than the standard remaining amount. Here, the endurance surveillance image refers to an image captured by a camera installed at the flying vehicle 100 while the flying vehicle 100 is flying.

Also, the surveillance method according to the current embodiment may further include operation SS5 of charging the battery, operation SS6 of obtaining a fixed surveillance image, operation SS7 of transmitting the fixed surveillance image, operation SS8 of giving a command to the flying vehicle 100 to stay in the air, and operation SS9 of the flying vehicle 100 staying in the air.

First, when the flying vehicle 100 is separated from the control tower 200 and in the air, the flying vehicle 100 obtains an endurance surveillance image of an endurance state (operation SS1). The flying vehicle 100 may go to a location that is set based on a preset program or according to a command given by the central control station 300, and may obtain an endurance surveillance image by using the camera 110.

Next, the endurance surveillance image may be transmitted to the control tower 200 via the first communication network 10, and then from the control tower 200 to the central control station 300 via the second communication network 20 (operation SS2). The first communication network 10 may be a short-range wireless communication network, and the second communication network 20 may be a long-range wired and/or wireless communication network.

The flying vehicle 100 compares the remaining amount of power at the battery 120 of the flying vehicle 100 with a standard remaining amount (operation SS3), besides obtaining and transmitting the endurance surveillance image. The standard remaining amount may be the amount of power at the battery 120 whereby the flying vehicle 100 is able to return to the control tower 200. In some embodiments, the standard remaining amount may be set by a function of a distance between the flying vehicle 100 and the control tower 200.

If the remaining amount of the battery 120 of the flying vehicle 100 is less than the standard remaining amount, the flying vehicle 100 lands on the control tower 200 (operation SS4). Information about the remaining amount of power at the battery 120 of the flying vehicle 100 may be transmitted to the control tower 200, and the control tower 200 may transmit a landing guide signal to the flying vehicle 100 accordingly. The landing guide signal may be generated based on an image of the flying vehicle 100 that is captured by the image capturer 220 of the control tower 200.

When the flying vehicle 100 lands on the control tower 200, the flying vehicle 100 receives power from the control tower 200 to charge the battery 120 (operation SS5) of the flying vehicle 100. A position of the control tower 200, where the flying vehicle 100 lands, may be set such that the battery 120 thereof may be automatically charged. That is, the power supply terminal 235 of the control tower 200 and the charging terminal 106 of the flying vehicle 100 may be connected to each other once the flying vehicle 100 lands on the control tower 200 and the battery 120 thereof may be automatically charged.

After landing on the control tower 200, the flying vehicle 100 may obtain a fixed surveillance image at a landing position (operation SS6). Next, the fixed surveillance image may be transmitted from the control tower 200 to the central control station 300 (operation SS7).

After the battery 120 of the battery 100 is completely charged or when the battery 120 has reached a set range, the flying vehicle 100 may receive an endurance command (operation SS8). The endurance command may be set based on a preset program in the flying vehicle 100. Alternatively, the endurance command may be received from the central control station 300.

The flying vehicle 100 may continue to stay in the air again according to the endurance command (operation SS9), and operations SS1 through SS9 may be repeatedly performed.

As described above, according to the surveillance method used by the surveillance system of the current embodiment, surveillance may be efficiently done by using the flying vehicle 100 and the control tower 200 without space limitations, and the flying vehicle 100 may be automatically charged by power received from the control tower 200.

As described above, according to the above embodiments, the surveillance system includes a flying vehicle that is mounted with a camera, and thus, an area where it is difficult to install a fixed surveillance camera may be monitored. In addition, the flying vehicle may receive power not from a central control station but from a control tower, and thus, power may be efficiently used and a broad area may be monitored.

It should be understood that the exemplary embodiments described above should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. A surveillance system comprising:
    a control tower configured to be coupled with and separated from a flying vehicle, and receive an image captured by the flying vehicle through a first communication network,
    wherein the control tower is further configured to transmit the received image to a central control station through a second communication network for analysis of the received image,
    wherein the control tower comprises:
        an image capturer configured to capture an image of the flying vehicle; and
        a landing guide configured to generate a landing guide signal based on the image obtained by the image capturer, and
    wherein the landing guide generates a landing guide signal by:
        capturing a first image of the flying vehicle by using the image capturer;
        comparing the first image with a pre-stored image to determine an amount of horizontal movement for the flying vehicle to generate and giving a command to horizontally move the flying vehicle based on the determined amount of horizontal movement;
        capturing a second image of the flying vehicle by using the image capturer;
        comparing the second image with the pre-stored image to determine an amount of vertical movement for the flying vehicle to generate and giving a command to vertically move the flying vehicle based on the determined amount of vertical movement; and
        determining an amount of altitude loss for the flying vehicle to generate and giving a command to the flying vehicle to lose altitude based on the determined amount of altitude loss.

2. The surveillance system of claim 1, wherein the first communication network is a short-range wireless communication network, and the second communication network is a long-range wired and/or wireless communication network.

3. The surveillance system of claim 1, wherein the control tower comprises:
    a mounting portion with which the flying vehicle is configured to be coupled; and a power supply configured to supply power to the flying vehicle when the flying vehicle is coupled with the control tower.

4. The surveillance system of claim 1, further comprising the flying vehicle and the central control station.

5. The surveillance system of claim 4, wherein the flying vehicle comprises:
- a global positioning system (GPS) receiver configured to receive position information about the flying vehicle;
- a battery configured to supply power to the flying vehicle; and
- a controller configured to control an operation of the flying vehicle,
- wherein the controller comprises a program whereby the flying vehicle returns to the control tower based on a remaining amount of the power and the position information.

6. A surveillance system comprising:
- a control tower configured to be coupled with and separated from a flying vehicle installed with a camera,
- wherein the control tower comprises:
  - an image capturer configured to capture an image of the flying vehicle;
  - a power supply configured to supply power to the flying vehicle when the control tower is coupled with the flying vehicle; and
  - a landing guide configured to generate a landing guide signal based on the captured image of the flying vehicle, and
- wherein the landing guide generates a landing guide signal by:
  - capturing a first image of the flying vehicle by using the image capturer;
  - comparing the first image with a pre-stored image to determine an amount of horizontal movement for the flying vehicle to generate and giving a command to horizontally move the flying vehicle based on the determined amount of horizontal movement;
  - capturing a second image of the flying vehicle by using the image capturer;
  - comparing the second image with the pre-stored image to determine an amount of vertical movement of the flying vehicle and giving a command to vertically move the flying vehicle based on the determined amount of vertical movement; and
  - determining an amount of altitude loss for the flying vehicle to generate and giving a command to the flying vehicle to lose altitude based on the determined amount of altitude loss.

7. The surveillance system of claim 6 further comprising the flying vehicle.

8. The surveillance system of claim 7, wherein the flying vehicle comprises:
- a global positioning system (GPS) receiver configured to receive position information about the flying vehicle;
- a battery configured to supply power to the flying vehicle; and
- a controller configured to control an operation of the flying vehicle,
- wherein the controller comprises a program whereby the flying vehicle returns to the control tower based on a remaining amount of power at the battery and the position information.

9. A surveillance method comprising:
- capturing an endurance surveillance image of a flying vehicle;
- transmitting the captured endurance surveillance image to a central control station via a control tower disposed adjacent to the flying vehicle;
- comparing a remaining amount of power at a battery of the flying vehicle with a standard remaining amount of power; and
- if the remaining amount of power at the battery is less than the standard remaining amount of power, landing the flying vehicle on the control tower based on a landing guide signal of the control tower,
- wherein the landing guide signal is generated by:
  - capturing a first image of the flying vehicle by an image capturer of the control tower;
  - comparing the captured first image with a pre-stored image to determine an amount of horizontal movement for the flying vehicle to generate and giving a command to horizontally move the flying vehicle based on the determined amount of horizontal movement;
  - capturing a second image of the flying vehicle by using the image capturer;
  - comparing the second image with the pre-stored image to determine an amount of vertical movement for the flying vehicle to generate and giving a command to vertically move the flying vehicle based on the determined amount of vertical movement; and
  - determining an amount of altitude loss for the flying vehicle to generate and giving a command to the flying vehicle to lose altitude based on the determined amount of altitude loss.

10. The surveillance method of claim 9, further comprising charging the battery of the flying vehicle after the flying vehicle has landed on the control tower.

11. The surveillance method of claim 9, further comprising:
- capturing a fixed surveillance image using the flying vehicle after the flying vehicle has landed on the control tower; and
- transmitting the captured fixed surveillance image to the central control station via the control tower.

12. The surveillance method of claim 9, further comprising receiving an endurance command based on a preset program that is set according to a charged state of the battery of the flying vehicle or an endurance command from the central control station.

13. The surveillance method of claim 9, further comprising:
- receiving position information about the flying vehicle;
- supplying power to the flying vehicle; and
- controlling an operation of the flying vehicle,
- wherein the controlling is performed using a program whereby the flying vehicle returns to the control tower based on the remaining amount of power at the battery and the position information.

14. The surveillance method of claim 9, further comprising:
- coupling the flying vehicle with the control tower and separating the flying vehicle from the control tower; and
- supplying power to the flying vehicle when the flying vehicle is coupled with the control tower.

15. The surveillance method of claim 9, further comprising:
- capturing an image of the flying vehicle; and
- generating a landing guide signal based on the captured image of the flying vehicle.

16. The surveillance method of claim 9, wherein the captured endurance surveillance image is transmitted from the flying vehicle to the control tower through a first communication network, wherein the captured endurance surveillance image is transmitted from the control tower to the central control station through a second communication network, and wherein the first communication network is a short-range wireless communication network, and the second communication network is a long-range wired and/or wireless communication network.

* * * * *